(12) United States Patent
Dent et al.

(10) Patent No.: US 12,104,059 B2
(45) Date of Patent: Oct. 1, 2024

(54) CURABLE SILICONE COMPOSITION AND CURED PRODUCT THEREOF

(71) Applicant: DOW SILICONES CORPORATION, Midland, MI (US)

(72) Inventors: Stanton J. Dent, Midland, MI (US); Randall G. Schmidt, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 614 days.

(21) Appl. No.: 17/424,215

(22) PCT Filed: Jan. 21, 2020

(86) PCT No.: PCT/US2020/014378
§ 371 (c)(1),
(2) Date: Jul. 20, 2021

(87) PCT Pub. No.: WO2020/154272
PCT Pub. Date: Jul. 30, 2020

(65) Prior Publication Data
US 2022/0112375 A1    Apr. 14, 2022

Related U.S. Application Data

(60) Provisional application No. 62/795,672, filed on Jan. 23, 2019.

(51) Int. Cl.
*C08L 83/04* (2006.01)
*C08G 77/08* (2006.01)
*C08G 77/12* (2006.01)
*C08G 77/20* (2006.01)
*C08G 77/24* (2006.01)

(52) U.S. Cl.
CPC .............. *C08L 83/04* (2013.01); *C08G 77/08* (2013.01); *C08G 77/12* (2013.01); *C08G 77/20* (2013.01); *C08G 77/24* (2013.01); *C08L 2201/08* (2013.01); *C08L 2201/10* (2013.01); *C08L 2205/025* (2013.01); *C08L 2205/03* (2013.01)

(58) Field of Classification Search
CPC combination set(s) only.
See application file for complete search history.

(56) References Cited

U.S. PATENT DOCUMENTS

| | | | |
|---|---|---|---|
| 4,882,398 A | 11/1989 | Mbah | |
| 5,110,882 A | 5/1992 | Hamada et al. | |
| 5,340,887 A | 8/1994 | Vincent et al. | |
| 5,366,809 A | 11/1994 | Schmidt et al. | |
| 5,373,078 A | 12/1994 | Juen et al. | |
| 5,696,210 A | 12/1997 | King et al. | |
| 8,853,332 B2 | 10/2014 | Hasegawa et al. | |
| 8,859,693 B2 | 10/2014 | Hasegawa et al. | |
| 2007/0166470 A1 | 7/2007 | Kashiwagi | |
| 2008/0254247 A1 | 10/2008 | Asaine | |
| 2013/0186564 A1 | 7/2013 | Keller et al. | |
| 2014/0051806 A1 | 2/2014 | Kato | |
| 2015/0284590 A1* | 10/2015 | Endo | C08L 83/04 524/588 |
| 2019/0215806 A1* | 7/2019 | Chai | H04W 72/23 |
| 2019/0225806 A1* | 7/2019 | Muramatsu | C08L 83/06 |
| 2020/0187539 A1 | 6/2020 | Marchesini et al. | |
| 2020/0277492 A1 | 9/2020 | Fukui et al. | |

FOREIGN PATENT DOCUMENTS

| | | | |
|---|---|---|---|
| CN | 101003686 A | 7/2007 | |
| CN | 103627176 A | 3/2014 | |
| EP | 2308676 A1 | 4/2011 | |
| JP | 2008260798 A | 10/2008 | |
| JP | 2011098566 A | 5/2011 | |
| JP | 2014500888 A | 1/2014 | |
| JP | 7179764 B2 | 11/2022 | |
| WO | 2010087522 A1 | 8/2010 | |
| WO | WO-2019049950 A1 * | 3/2019 | B32B 27/00 |

OTHER PUBLICATIONS

International Search Report for PCT/US2020/014378 dated Apr. 15, 2020, 4 pages.
Glenn V. Gordon, Randall G. Schmidt, Marlitt Quintero, Natalie J. Benton, Terence Cosgrove, Val J. Krukonis, Kara Williams, and Paula M. Wetmore, Macromolecules 2010 43 (23), 10132-10142.

* cited by examiner

*Primary Examiner* — Marc S Zimmer
(74) *Attorney, Agent, or Firm* — Warner Norcross + Judd LLP

(57) ABSTRACT

A curable silicone composition is disclosed. The curable silicone composition comprises: (A) a silicone resin consisting essentially of $R_3SiO_{1/2}$ siloxane units and $SiO_{4/2}$ siloxane units, wherein each R is the same or different, and independently selected from halogen-substituted or unsubstituted monovalent hydrocarbon groups free of aliphatic unsaturated bonds; (B) an organopolysiloxane having at least two alkenyl groups per molecule and free of $SiO_{4/2}$ siloxane units in the organopolysiloxane; (C) an organosiloxane having at least three silicon atom-bonded hydrogen atoms per molecule; and (D) a hydrosilylation catalyst. The curable silicone composition can be cured to form a cured product having a high tensile strength in addition to a low modulus.

15 Claims, No Drawings

CURABLE SILICONE COMPOSITION AND CURED PRODUCT THEREOF

CROSS-REFERENCE TO RELATED APPLICATIONS

This application is the U.S. National Stage of International Application No. PCT/US2020/014378 filed on 21 Jan. 2020, which claims priority to and all advantages of U.S. Provisional Patent Application No. 62/795,672 filed on 23 Jan. 2019, the content of which is incorporated herein by reference.

TECHNICAL FIELD

The present invention relates to a curable silicone composition, and a cured product obtained by curing this composition.

BACKGROUND ART

Curable organopolysiloxane compositions are widely employed in various industries due to their unique properties, which include excellent electrical insulation, excellent thermal stability, and excellent transparency. In particular, curable silicone compositions that can be cured by a hydrosilylation reaction and that contain a silicone resin are known.

For example, U.S. Pat. No. 4,882,398 A discloses a curable silicone composition comprising: a diorganovinylsiloxy-terminated diorganopolysiloxane, a silicone resin consisting essentially of $SiO_2$, $(CH_3)_3SiO_{1/2}$ and $(CH_3)_2(CH_2=CH)SiO_{1/2}$ units, where the molar ratio of the combination of $(CH_3)_3SiO_{1/2}$ and $(CH_3)_2(CH_2=CH)SiO_{1/2}$ units to $SiO_2$ units is from 0.6 to 1.1, and having from 1.5 to 3.5 weight % of vinyl radical, an organohydrogensiloxane, and a hydrosilylation catalyst; and both U.S. Pat. No. 8,859,693 B2 and U.S. Pat. No. 8,853,332 B2 disclose a curable silicone composition comprising: a dialkylpolysiloxane having at least two alkenyl groups per molecule, a silicone resin comprising $SiO_{4/2}$ units, $(CH_3)_2(CH_2=CH)SiO_{1/2}$ units and $(CH_3)_3SiO_{1/2}$ units, an organopolysiloxane having at least three silicon atom-bonded hydrogen atoms per molecule, and a hydrosilylation catalyst.

It is well known that curable silicone compositions described above can be used in injection molding. However, cured products obtained by curing such curable silicone compositions have a high tensile strength and a high modulus.

U.S. Pat. No. 5,373,078 A discloses that the addition of up to 40 weight % of the non-reactive liquid silicone resin comprising $(CH_3)_3SiO_{1/2}$ units and $SiO_2$ units, to high viscosity liquid curable silicone composition reduces the viscosity of the composition without any substantial adverse effect on the physical properties of the cured product, particularly tensile strength, elongation and tear strength. However, a cured product obtained by curing such curable silicone composition also has a high tensile strength and a high modulus.

PRIOR ART DOCUMENTS

Patent Documents

Patent Document 1: U.S. Pat. No. 4,882,398 A
Patent Document 2: U.S. Pat. No. 8,853,332 B2
Patent Document 3: U.S. Pat. No. 8,859,693 B2
Patent Document 4: U.S. Pat. No. 5,373,078 A

BRIEF SUMMARY OF THE INVENTION

Technical Problem

An object of the present invention is to provide a curable silicone composition that forms a cured product having a high tensile strength in addition to a low modulus. In addition, another object of the present invention is to provide a cured product having a high tensile strength in addition to a low modulus.

Solution to Problem

The present invention is further directed to a curable silicone composition comprising:
 (A) from about 40 to about 60 parts by mass of a silicone resin consisting essentially of $R_3SiO_{1/2}$ siloxane units and $SiO_{4/2}$ siloxane units, wherein each R is the same or different, and independently selected from halogen-substituted or unsubstituted monovalent hydrocarbon groups free of aliphatic unsaturated bonds, and the mole ratio of $R_3SiO_{1/2}$ siloxane units to $SiO_{4/2}$ siloxane units in the silicone resin having a value of from about 0.6 to about 1.5;
 (B) from about 60 to about 40 parts by mass of an organopolysiloxane having at least two alkenyl groups per molecule and free of $SiO_{4/2}$ siloxane units in the organopolysiloxane, with the proviso that the total amount of components (A) and (B) is 100 parts by mass;
 (C) an organosiloxane having at least three silicon atom-bonded hydrogen atoms per molecule, in an amount of the organosiloxane being sufficient enough to provide a molar ratio of silicon atom-bonded hydrogen atoms of component (C) to the alkenyl groups in component (B) in the range of from about 1.0 to about 3.0; and
 (D) a hydrosilylation catalyst in an amount sufficient to initiate curing of this composition.

In various embodiments, component (C) comprises: a silicone resin consisting essentially of $R_2HSiO_{1/2}$ siloxane units and $SiO_{4/2}$ siloxane units, wherein each R is independently selected and as described above, and the mole ratio of $R_2HSiO_{1/2}$ siloxane units to $SiO_{4/2}$ siloxane units in the silicone resin having a value of from about 1.5 to about 4.0.

In various embodiments, the curable silicone composition further comprises: (E) a reaction inhibitor in an amount sufficient to control curing this composition.

In various embodiments, the curable silicone composition further comprises: (F) an organosiloxane having two silicon atom-bonded hydrogen atoms per molecule, in an amount such that the silicon atom-bonded hydrogen atoms in the organosiloxane in the total silicon atom-bonded hydrogen atoms in components (C) and (F) is not more than about 40 mole %.

In various embodiments, the curable silicone composition is used in injection molding.

The present invention is further directed to a cured product which is obtained by curing the curable silicone composition described above.

In various embodiments, the cured product has a durometer of less than Shore A 15 and the tensile strength of greater than 150 psi (pound-force per square inch; where 1 psi=~6.89476 kilopascal (kPa)).

Effects of Invention

The curable silicone composition of the present invention is characterized by forming a cured product having a high tensile strength in addition to a low modulus.

Furthermore, the cured product of the present invention is characterized by having a high tensile strength in addition to a low modulus.

Definitions

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

DETAILED DESCRIPTION OF THE INVENTION

<Curable Silicone Composition>

First, the curable silicone composition of the present invention will be described in detail.

Component (A) is a silicone resin consisting essentially of $R_3SiO_{1/2}$ siloxane units and $SiO_{4/2}$ siloxane units. In the formula, each R is the same or different, and independently selected from halogen-substituted or unsubstituted monovalent hydrocarbon groups free of aliphatic unsaturated bonds. Examples of the hydrocarbon groups represented by R include alkyl groups having from 1 to 12 carbons, such as methyl groups, ethyl groups, propyl groups, butyl groups, pentyl groups, hexyl groups, heptyl groups, octyl groups, nonyl groups, decyl groups, undecyl groups, and dodecyl groups; aryl groups having from 6 to 12 carbon atoms such as phenyl groups, tolyl groups, xylyl groups, and naphthyl groups; aralkyl groups having from 7 to 12 carbons, such as benzyl groups, phenethyl groups, and phenylpropyl groups; and halogenated alkyl groups such as 3-chloropropryl groups and 3,3,3-trifluoropropyl groups. In certain embodiments, each R is independently an alkyl group. In further embodiments, each R is a methyl group.

The mole ratio of $R_3SiO_{1/2}$ siloxane units to $SiO_{4/2}$ siloxane units in the silicone resin has a value of from about 0.6 to about 1.5, alternatively a value of from about 0.7 to about 1.2, alternatively a value of from about 0.8 to about 1.1. This is because, when the ratio is within the range described above, curing efficiently proceeds to form a cured product having excellent tensile strength and low modulus.

In various embodiments, the number average molecular weight (Mn) of component (A) on a standard polystyrene basis by gel permeation chromatography is in the range from 3,000 to 7,000, alternatively in the range from 4,000 to 6,000. This is because, when the molecular weight of component (A) is within the range described above, the resulting composition can cure to form a cured product having excellent tensile strength and low modulus.

The content of component (A) is from about 40 to about 60 parts by mass, alternatively from about 45 to about 60 parts by mass, alternatively from about 45 to about 55 parts by mass, per 100 parts by mass of the total amount of components (A) and (B). This is because, when the content of component (A) is within the range described above, curing efficiently proceeds to form a cured product having excellent tensile strength and low modulus. Additionally, when the content is greater than the upper limit of the range described above, the resulting composition has substantially high viscosities at ambient temperatures, small amounts of solvent or plasticizer will greatly influence the viscosity of the composition, and residual solvent will affect the viscosity regardless of how much resin the composition contains.

Component (B) is an organopolysiloxane having at least two alkenyl groups per molecule and free of $SiO_{4/2}$ siloxane units in the organopolysiloxane. Examples of the alkenyl groups include alkenyl groups having from 2 to 12 carbon atoms such as vinyl groups, allyl groups, butenyl groups, pentenyl groups, hexenyl groups, heptenyl groups, octenyl groups, nonenyl groups, decenyl groups, undecenyl group, and dodecenyl groups. The bonding positions of the alkenyl groups in component (B) are not particularly limited, and examples thereof include a molecular terminal(s) and/or side chain(s) of the molecule.

In component (B), silicon atom-bonded organic groups other than the alkenyl groups are not limited, and may be exemplified by alkyl groups having from 1 to 12 carbon atoms, aryl groups having from 6 to 20 carbon atoms, aralkyl groups having from 7 to 20 carbon atoms, and the groups in which some or all of the hydrogen atoms bonded in these groups are substituted with halogen atoms, such as a chlorine atom and bromine atom. Examples of the silicon atom-bonded organic groups include alkyl groups such as methyl groups, ethyl groups, propyl groups, butyl groups, pentyl groups, hexyl groups, heptyl groups, octyl groups, nonyl groups, decyl groups, undecyl groups, and dodecyl groups; aryl groups such as phenyl groups, tolyl groups, xylyl groups, naphthyl groups, anthracenyl groups, phenanthryl groups, and pyrenyl groups; aralkyl groups such as benzyl groups, phenethyl groups, naphthylethyl groups, naphthylpropyl groups, anthracenylethyl groups, phenanthrylethyl groups, and pyrenylethyl groups; and halogenated groups such as 3-chloropropyl groups, and 3,3,3-trifluoropropyl groups. In certain embodiments, in a molecule, at least one of the silicon atom-bonded organic groups is an aryl group.

Component (B) does not have $SiO_{4/2}$ siloxane units. Examples of the molecular structure of component (B) include straight chain and partially branched straight chain. In certain embodiments, the molecular structure of component (B) is straight chain.

In various embodiments, component (B) is an alkenyl-functional dialkylpolysiloxane with at least two alkenyl groups per molecule. In certain embodiments, component (B) is a diorganopolysiloxane and may include, without limitation, dimethylpolysiloxanes end blocked at both molecular chain terminals by dimethylvinylsiloxy groups, dimethylsiloxane-methylvinylsiloxane copolymers end-blocked at both molecular chain terminals by dimethylvinylsiloxy groups, methylvinylpolysiloxanes endblocked at both molecular chain terminals by trimethylsiloxy groups, dimethylsiloxane-methylvinylsiloxane copolymers end-blocked at both molecular chain terminals by trimethylsiloxy groups, or a combination of any two or more thereof.

In various embodiments, the viscosity of component (B) at 25° C. is from about 100 mPa·s to about 2,000,000 mPa·s, alternatively from about 1,000 mPa·s to about 500,000 mPa·s. This is because, when the viscosity of component (B) is within the range described above, curing efficiently proceeds to form a cured product having excellent tensile strength and low modulus. The viscosity at 25° C. was measured by a viscometer having cone/plate test geometry in accordance with Test Method B of ASTM D 7867.

The content of component (B) is from about 60 to about 40 parts by mass, alternatively from about 60 to about 45 parts by mass, alternatively from about 55 to about 45 parts by mass, per 100 parts by mass of the total amount of components (A) and (B). This is because, when the content of component (B) is within the range described above, curing efficiently proceeds to form a cured product having excellent tensile strength and low modulus.

Component (C) is an organosiloxane having at least three silicon atom-bonded hydrogen atoms per molecule. Organic groups in component (C) are exemplified by monovalent hydrocarbon groups free of aliphatic unsaturated bonds, such as methyl groups, ethyl groups, propyl groups, butyl groups, pentyl groups, hexyl groups, heptyl groups, and other alkyl groups having 1 to 12 carbon atoms; phenyl groups, tolyl groups, xylyl groups, naphthyl group, and other aryl groups having 6 to 12 carbon atoms, and methyl groups and phenyl groups are most typical.

The organosiloxane for component (C) is exemplified by methylphenylpolysiloxane having both terminals of the molecular chain end-blocked by dimethylhydrogensiloxy groups; methylphenylsiloxane-dimethylsiloxane copolymer having both terminals of the molecular chain end-blocked by dimethylhydrogensiloxy groups; methylphenylsiloxane-methylhydrogensiloxane copolymer having both terminals of the molecular chain end-blocked by trimethylsiloxy groups; methylphenylsiloxane-methylhydrogensiloxane-dimethylsiloxane copolymer having both terminals of the molecular chain end-blocked by trimethylsiloxy groups; organopolysiloxane copolymer made up of siloxane units represented by $(CH_3)_2HSiO_{1/2}$ and siloxane units represented by $C_6H_5SiO_{3/2}$; organopolysiloxane copolymer made up of siloxane units represented by $(CH_3)_2HSiO_{1/2}$, siloxane units represented by $(CH_3)_3SiO_{1/2}$, and siloxane units represented by $C_6H_5SiO_{3/2}$; organopolysiloxane copolymer made up of siloxane units represented by $(CH_3)_2HSiO_{1/2}$, siloxane units represented by $(CH_3)_2SiO_{2/2}$, and siloxane units represented by $C_6H_5SiO_{3/2}$; organopolysiloxane copolymer made up of siloxane units represented by $(CH_3)_2HSiO_{1/2}$, siloxane units represented by $C_6H_5(CH_3)_2SiO_{1/2}$, and siloxane units represented by $SiO_{4/2}$; organopolysiloxane copolymer made up of siloxane units represented by $(CH_3)HSiO_{2/2}$ and siloxane units represented by $C_6H_5SiO_{3/2}$; as well as mixtures of two or more of the above.

While, in view of the excellent mechanical properties of the resultant cured product, component (C) comprises a silicone resin consisting essentially of $R_2HSiO_{1/2}$ siloxane units and $SiO_{4/2}$ siloxane units.

In the formula, each R is the same or different, and independently selected from halogen-substituted or unsubstituted monovalent hydrocarbon groups free of aliphatic unsaturated bonds. Examples of the hydrocarbon groups represented by R include alkyl groups having from 1 to 12 carbons, such as methyl groups, ethyl groups, propyl groups, butyl groups, pentyl groups, hexyl groups, heptyl groups, octyl groups, nonyl groups, decyl groups, undecyl groups, and dodecyl groups; aryl groups having from 6 to 12 carbon atoms such as phenyl groups, tolyl groups, xylyl groups, and naphthyl groups; aralkyl groups having from 7 to 12 carbons, such as benzyl groups, phenethyl groups, and phenylpropyl groups; and halogenated alkyl groups such as 3-chloropropryl groups and 3,3,3-torifluoropropyl groups. In certain embodiments, each R is independently an alkyl group. In further embodiments, each R is a methyl group.

The mole ratio of $R_2HSiO_{1/2}$ siloxane units to $SiO_{4/2}$ siloxane units in the silicone resin has a value of from about 1.5 to about 4.0, alternatively a value of from about 1.6 to about 3.0, alternatively a value of from about 1.8 to about 3.0. This is because, when the ratio is within the range described above, curing efficiently proceeds to form a cured product having excellent tensile strength and low modulus.

In various embodiments, the kinematic viscosity of component (C) at 25° C. is from about 1 $mm^2/s$ to about 1,000 $mm^2/s$, alternatively from about 1 $mm^2/s$ to about 500 $mm^2/s$. This is because, when the viscosity of component (C) is within the range described above, curing efficiently proceeds to form a cured product having excellent tensile strength and low modulus. The kinematic viscosity at 25° C. was measured in accordance with a method based on ASTM D 7867.

The content of component (C) in the present composition, per 1 mole of total alkenyl groups in components (A) and (B), is in a range such that the silicon-bonded hydrogen atoms in component (C) is in a range from about 1.0 to about 3.0 moles, alternatively in a range from about 1.0 to about 2.0 moles. This is because, when the content of component (C) is within the range described above, curing efficiently proceeds to form a cured product having excellent heat tensile strength and low modulus.

Component (D) is a hydrosilylation catalyst used to facilitate curing of the present composition. Hydrosilylation catalyst for component (D) is well known in the art and commercially available. Suitable hydrosilylation catalysts include, without limitation, a platinum group metal which includes platinum, rhodium, ruthenium, palladium, osmium, or iridium metal or an organometallic compound thereof and a combination of any two or more thereof. Component (D) is typically a platinum-based catalyst so that the curing of the present composition can be dramatically accelerated. Examples of the platinum-based catalyst include a platinum fine powder, chloroplatinic acid, an alcohol solution of chloroplatinic acid, a platinum-alkenylsiloxane complex, a platinum-olefin complex and a platinum-carbonyl complex, with a platinum-alkenylsiloxane complex being most typical.

In various embodiments, component (D) is a hydrosilylation catalyst that includes complexes of platinum with low molecular weight organopolysiloxanes that include 1,3-divinyl-1,1,3,3-tetramethyldisiloxane complexes with platinum. These complexes may be microencapsulated in a resin matrix. In specific embodiments, the catalyst includes 1,3-divinyl-1,1,3,3-tetramethyldisiloxane complex with platinum.

Examples of suitable hydrosilylation catalysts for component (D) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are exemplified in U.S. Pat. Nos. 4,766,176 and 5,017,654.

The content of component (D) in the present composition is an effective quantity for facilitating curing of the present composition. Specifically, in order to satisfactorily cure the present composition, the content of component (D) is typically a quantity whereby the content of catalytic metal in component (D) relative to the present composition is from about 0.01 to about 500 ppm, alternatively from about 0.01 to about 100 ppm, alternatively from about 0.01 to about 50 ppm, alternatively from about 0.1 to about 10 ppm, in terms of mass units.

In various embodiments, the curable silicone composition comprises (E) a reaction inhibitor in order to adjust the cure rate of the curable silicone composition. In certain embodiments, component (E) includes, without limitation, an alkyne alcohol such as 2-methyl-3-butyn-2-ol, 3,5-dimethyl-1-hexyn-3-ol, or 2-phenyl-3-butyn-2-ol, 1-ethynyl-cyclohexan-1-ol; an ene-yne compound such as 3-methyl-3-penten-1-yne or 3,5-dimethyl-3-hexen-1-yne; or 1,3,5,7-tetramethyl-1,3,5,7-tetravinylcyclotetrasiloxane, 1,3,5,7-tetramethyl-1,3,5,7-tetrahexenylcyclotetrasiloxane, or a benzotriazole may be incorporated as an optional component in the present composition.

The content of the reaction inhibitor in the present composition is not particularly limited, but if included is typically from about 0.0001 to about 5 parts by mass per 100 parts by mass of total mass of the above-described components (A) to (D).

Optionally, the curable silicone composition may further include one or more additional ingredients. The additional ingredient or combination of ingredients may include, for example, an organopolysiloxane having two silicon atom-bonded hydrogen atoms per molecule, a mold release agent, a filler, an adhesion promoter, a heat stabilizer, a flame retardant, a reactive diluent, an oxidation inhibitor, or a combination of any two or more thereof.

In particular, in view of the low hardness of the resultant cured product, component (F) is an organosiloxane having two silicon atom-bonded hydrogen atoms per molecule. Organic groups in component (F) are exemplified by monovalent hydrocarbon groups free of aliphatic unsaturated bonds, such as methyl groups, ethyl groups, propyl groups, butyl groups, pentyl groups, hexyl groups, heptyl groups, and other alkyl groups having 1 to 12 carbon atoms; phenyl groups, tolyl groups, xylyl groups, naphthyl group, and other aryl groups having 6 to 12 carbon atoms, and methyl groups and phenyl groups are most typical.

The organosiloxane for component (F) is exemplified by a dimethylpolysiloxane having both terminals of the molecular chain end-blocked by dimethylhydrogensiloxy groups; a methylphenylsiloxane-dimethylsiloxane copolymer having both terminals of the molecular chain end-blocked by dimethylhydrogensiloxy groups; and a diphenylpolysiloxane having both terminals of the molecular chain end-blocked by dimethylhydrogensiloxy groups.

The content of component (F) is not limited, but it is generally in an amount such that the silicon atom-bonded hydrogen atoms in the organosiloxane in the total silicon atom-bonded hydrogen atoms in components (C) and (F) is not more than about 50 mole %.

In order to improve adhesion of the cured product to a base material being contacted during curing, the present composition may contain an adhesion-imparting agent. In certain embodiments, the adhesion-imparting agents are organosilicon compounds having at least one alkoxy group bonded to a silicon atom in a molecule. This alkoxy group is exemplified by a methoxy group, an ethoxy group, a propoxy group, a butoxy group, and a methoxyethoxy group; and the methoxy group is most typical. Moreover, non-alkoxy groups bonded to a silicon atom of this organosilicon compound are exemplified by substituted or non-substituted monovalent hydrocarbon groups such as alkyl groups, alkenyl groups, aryl groups, aralkyl groups, halogenated alkyl groups and the like; epoxy group-containing monovalent organic groups such as a 3-glycidoxypropyl group, a 4-glycidoxybutyl group, or similar glycidoxyalkyl groups; a 2-(3,4-epoxycyclohexyl)ethyl group, a 3-(3,4-epoxycyclohexyl)propyl group, or similar epoxycyclohexylalkyl groups; and a 4-oxiranylbutyl group, an 8-oxiranyloctyl group, or similar oxiranylalkyl groups; acrylic group-containing monovalent organic groups such as a 3-methacryloxypropyl group and the like; and a hydrogen atom. This organosilicon compound generally has a silicon-bonded alkenyl group or silicon-bonded hydrogen atom. Moreover, due to the ability to impart good adhesion with respect to various types of base materials, this organosilicon compound generally has at least one epoxy group-containing monovalent organic group in a molecule. This type of organosilicon compound is exemplified by organosilane compounds, organosiloxane oligomers and alkyl silicates. Molecular structure of the organosiloxane oligomer or alkyl silicate is exemplified by a linear chain structure, partially branched linear chain structure, branched chain structure, ring-shaped structure, and net-shaped structure. A linear chain structure, branched chain structure, and net-shaped structure are typical. This type of organosilicon compound is exemplified by silane compounds such as 3-glycidoxypropyltrimethoxysilane, 2-(3,4-epoxycyclohexyl)ethyltrimethoxysilane, 3-methacryloxy propyltrimethoxysilane, and the like; siloxane compounds having at least one silicon-bonded alkenyl group or silicon-bonded hydrogen atom, and at least one silicon-bonded alkoxy group in a molecule; mixtures of a silane compound or siloxane compound having at least one silicon-bonded alkoxy group and a siloxane compound having at least one silicon-bonded hydroxyl group and at least one silicon-bonded alkenyl group in the molecule; and methyl polysilicate, ethyl polysilicate, and epoxy group-containing ethyl polysilicate.

In the present composition, the content of the adhesion-imparting agents is not particularly limited, but in order to achieve good adhesion to a base material being contacted during curing, the content of the adhesion-imparting agents is in certain embodiments from about 0.01 to about 10 parts by mass per 100 parts total mass of components (A) to (D).

An inorganic filler such as silica, glass, alumina, or zinc oxide; an organic resin fine powder of a polymethacrylate resin and the like; a heat-resistant agent, a dye, a pigment, a flame retardant, a solvent, and the like may be incorporated as optional components in the present composition at levels that do not impair the objective of the present invention.

In various embodiments, the curable silicone composition of the present invention is an injection moldable silicone composition.

<Cured Product>

Next, the cured product of the present invention will be described in detail.

The cured product of the present invention is obtained by curing the aforementioned curable silicone composition. The form of the cured product is not particularly limited, and can be in the form of, for example, a sheet, film, or a lens. The cured product can be handled alone but can also be handled in a state whereby the cured product covers or seals an optical element.

In certain embodiments, the method further includes heating the curable silicone composition to form a cured product. The heating step may further include, for example, injection molding, transfer molding, casting, extrusion, over-molding, compression molding, and cavity molding and the cured product is a molded, cast, or extruded article including lenses, light guides, optically clear adhesive layer, or other optical elements. In specific embodiments, injection molding is utilized.

EXAMPLES

The following examples, illustrating the curable silicone composition and the cured product thereof, are intended to illustrate and not limited the present invention. Moreover, the physical property values are values measured at 25° C., and the properties (hardness, tensile strength, and elongation) of the cured product were measured as follows.

<Shore A Hardness>

A 3 mm-thick cured product is obtained by press curing the curable silicone composition for 15 minutes at 150° C. and post cured for 45 minutes at 150° C. in an air circulating oven. The cured products were stacked to be at least 6 mm in thickness for durometer measurement. The hardness of the cured product is measured by means of a Shore A durometer specified by ASTM D2240.

<Tensile Strength>

A 3 mm-thick cured product was fabricated by curing the curable silicone composition by heating for 60 minutes at 150° C. The tensile strength of the cured product was measured according to the methods specified in ASTM D412.

<Elongation>

A 3 mm-thick cured product was fabricated by curing the curable silicone composition by heating for 60 minutes at 150° C. The elongation of the cured product was measured according to the methods specified in ASTM D412.

The nature and designation of the materials used in the following examples for components (A)-(F) are as indicated below. In the formulae, Me and Vi represent a methyl group and vinyl group, respectively.

Component (A)
- (a-1): a silicone resin represented by the average unit formula
  $(Me_3SiO_{1/2})_{0.48}(SiO_{4/2})_{0.52}$, that has a number-average molecular weight (Mn) of approximately 4,700.
- (a-2): a silicone resin represented by the average unit formula
  $(Me_3SiO_{1/2})_{0.47}(ViMe_2SiO_{1/2})_{0.05}(SiO_{4/2})_{0.48}$, that has a number-average molecular weight (Mn) of approximately 4,600 and a vinyl groups content of 1.9 mass %.

Component (B)
- (b-1): a dimethylpolysiloxane endblocked by dimethylvinylsiloxy groups at both molecular chain terminals, having a viscosity at 25° C. of approximately 2,000 mPa·s and having a vinyl groups content of approximately 0.24 mass %.

Component (C)
- (c-1): an organopolysiloxane represented by the average unit formula
  $(Me_2HSiO_{1/2})_{0.68}(SiO_{4/2})_{0.32}$, that has a kinematic viscosity at 25° C. of approximately 20 mm$^2$/s and having a silicon atom-bonded hydrogen atom content of approximately 0.97 mass %.

Component (D)
- (d-1): a solution of a platinum-1,3-divinyl-1,1,3,3-tetramethyldisiloxane complex in a dimethylpolysiloxane endblocked by dimethylvinylsiloxy groups at both molecular chain terminals, having a viscosity at 25° C. of 350 mPa·s and having a vinyl groups content of 0.48 mass % (the solution containing 0.05% by mass of platinum).

Component (E)
- (e-1): 1-ethynyl-cyclohexan-1-ol

Component (F)
- (f-1): a dimethylpolysiloxane endblocked by dimethylhydrogensiloxy groups at both molecular chain terminals, having a kinematic viscosity at 25° C. of approximately 10 mm$^2$/s and having a silicon atom-bonded hydrogen atom content of approximately 0.15 mass %.

Practical Examples 1-7 and Comparative Example 1

The materials described above were mixed to uniformity in the quantity proportions shown in Table 1 to produce curable silicone compositions. The resulting compositions were heated for 60 minutes at 150° C. to produce the 3 mm-thick cured sheet, which was submitted to measurement of the tensile strength. The compositions were also heated for 60 minutes at 150° C. to produce the 3 mm-thick cured product, which was submitted to measurement of the hardness at 25° C. The results are given in Table 1. The SiH/Vi ratio in each of Tables 1-3 indicates the ratio of the number of moles of silicon-bonded hydrogen in component (C), or components (C) and (F), per 1 mole of the vinyl group in component (B). The R/P ratio in each of Tables 1-3 indicates the mass ratio of component (A) per the total mass of components (A) and (B).

TABLE 1

|  |  | Comparative Example 1 | Practical Example 1 | Practical Example 2 | Practical Example 3 | Practical Example 4 | Practical Example 5 | Practical Example 6 | Practical Example 7 |
|---|---|---|---|---|---|---|---|---|---|
| Curable Silicone | (a-1) | 29.98 | 39.99 | 50.00 | 54.96 | 59.12 | 49.22 | 49.23 | 49.28 |
| Composition | (b-1) | 68.22 | 58.31 | 48.40 | 43.54 | 39.42 | 49.22 | 49.23 | 29.28 |
| (parts by mass) | (c-1) | 1.05 | 0.94 | 0.84 | 0.74 | 0.69 | 0.80 | 0.74 | 0.69 |
|  | (d-1) | 0.57 | 0.57 | 0.57 | 0.57 | 0.57 | 0.57 | 0.57 | 0.57 |
|  | (e-1) | 0.20 | 0.20 | 0.20 | 0.20 | 0.20 | 0.20 | 0.20 | 0.20 |
| SiH/Vi Ratio |  | 1.3 | 1.4 | 1.4 | 1.4 | 1.4 | 1.4 | 1.3 | 1.2 |
| R/P Ratio |  | 30 | 40 | 50 | 55 | 59 | 50 | 50 | 50 |
| Shore A Hardness |  | 15.5 | 11.5 | 8.4 | 7.6 | 13.5 | 9.6 | 6.7 | 1.9 |
| Tensile Strength N/cm$^2$ (psi) |  | 34.5 (50) | 32.4 (47) | 103.4 (150) | 339.9 (493) | 339.2 (492) | 173.1 (251) | 148.9 (216) | 72.4 (105) |

Practical Examples 8-11

The materials described above were mixed to uniformity in the quantity proportions shown in Table 2 to produce curable silicone compositions. The resulting compositions were heated for 60 minutes at 150° C. to produce the 3 mm-thick cured sheet, which was submitted to measurement of the tensile strength. The compositions were also heated for 60 minutes at 150° C. to produce the 3 mm-thick cured product, which was submitted to measurement of the hardness at 25° C. The results are given in Table 2.

TABLE 2

|  |  | Practical Example 8 | Practical Example 9 | Practical Example 10 | Practical Example 11 |
|---|---|---|---|---|---|
| Curable Silicone | (a-1) | 54.17 | 53.69 | 53.85 | 52.99 |
| Composition | (b-1) | 44.32 | 43.93 | 44.06 | 43.35 |
| (parts by mass) | (c-1) | 0.75 | 0.59 | 0.52 | 0.37 |
|  | (d-1) | 0.57 | 0.57 | 0.57 | 0.57 |
|  | (e-1) | 0.20 | 0.20 | 0.20 | 0.20 |
|  | (f-1) | 0 | 1.02 | 1.53 | 2.53 |
| SiH/Vi Ratio |  | 1.4 | 1.4 | 1.4 | 1.4 |
| R/P Ratio |  | 54 | 54 | 54 | 53 |
| Shore A Hardness |  | 13.0 | 7.0 | 5.9 | 0 |
| Tensile Strength N/cm$^2$ (psi) |  | 311.6 (452) | 230.3 (334) | 217.9 (316) | 84.8 (123) |

Practical Examples 12 and Comparative Examples 2-3

The materials described above were mixed to uniformity in the quantity proportions shown in Table 3 to produce curable silicone compositions. The resulting compositions were heated for 60 minutes at 150° C. to produce the 3 mm-thick cured product, which was submitted to measurement of the tensile strength and the elongation. The compositions were also heated for 60 minutes at 150° C. to produce the 3 mm-thick cured product, which was submitted to measurement of the hardness at 25° C.

TABLE 3

|  |  | Practical Example 12 | Comparative Example 2 | Comparative Example 3 |
|---|---|---|---|---|
| Curable Silicone | (a-1) | 39.30 | 34.09 | 28.83 |
| Composition | (a-2) | 0 | 5.00 | 10.00 |
| (parts by mass) | (b-1) | 58.96 | 58.61 | 58.32 |
|  | (c-1) | 0.97 | 1.53 | 2.08 |
|  | (d-1) | 0.57 | 0.57 | 0.57 |
|  | (e-1) | 0.20 | 0.20 | 0.20 |
| SiH/Vi Ratio |  | 1.4 | 1.4 | 1.4 |
| Shore A Hardness |  | 12.0 | 18.6 | 27.0 |
| Tensile Strength N/cm$^2$ (psi) | | 50.3 (73) | 52.4 (76) | 145.5 (211) |
| Elongation (%) |  | 318 | 183 | 154 |

INDUSTRIAL APPLICABILITY

The curable silicone composition of the present invention, because it forms a flexible and highly transparent cured product, is useful as an optical member or component that is permeable to light, e.g., visible light, infrared, ultraviolet, far ultraviolet, x-ray, laser, and so forth. In particular, because the cured product provided by the cure of the curable silicone composition of the present invention does not undergo temperature-induced variations in transparency, this cured product is well suited for use as an optical member or component for devices involved with high energy, high output light.

What is claimed is:

1. A curable silicone composition comprising:
   (A) from about 40 to about 60 parts by mass of a silicone resin consisting essentially of $R_3SiO_{1/2}$ siloxane units and $SiO_{4/2}$ siloxane units, wherein each R is the same or different, and independently selected from halogen-substituted or unsubstituted monovalent hydrocarbon groups free of aliphatic unsaturated bonds, and the mole ratio of $R_3SiO_{1/2}$ siloxane units to $SiO_{4/2}$ siloxane units in the silicone resin having a value of from about 0.6 to about 1.5;
   (B) from about 60 to about 40 parts by mass of an organopolysiloxane having at least two alkenyl groups per molecule and free of $SiO_{4/2}$ siloxane units in the organopolysiloxane, with the proviso that the total amount of components (A) and (B) is 100 parts by mass;
   (C) an organosiloxane having at least three silicon atom-bonded hydrogen atoms per molecule, in an amount of the organosiloxane being sufficient enough to provide a molar ratio of silicon atom-bonded hydrogen atoms of component (C) to the alkenyl groups in component (B) in the range of from about 1.0 to about 3.0; wherein component (C) comprises a silicone resin consisting essentially of $R_2HSiO_{1/2}$ siloxane units and $SiO_{4/2}$ siloxane units, wherein each R is independently selected and as described above, and the mole ratio of $R_2HSiO_{1/2}$ siloxane units to $SiO_{4/2}$ siloxane units in the silicone resin having a value of from about 1.5 to about 4.0; and
   (D) a hydrosilylation catalyst in an amount sufficient to initiate curing of the composition.

2. The curable silicone composition according to claim 1, wherein the mole ratio of $R_2HSiO_{1/2}$ siloxane units to $SiO_{4/2}$ siloxane units in the silicone resin has a value of from about 1.8 to about 3.0.

3. The curable silicone composition according to claim 1, further comprising:
   (E) a reaction inhibitor in an amount sufficient to control curing the composition.

4. The curable silicone composition according to claim 1, further comprising:
   (F) an organosiloxane having two silicon atom-bonded hydrogen atoms per molecule, in an amount such that the silicon atom-bonded hydrogen atoms in the organosiloxane in the total silicon atom-bonded hydrogen atoms in components (C) and (F) is not more than 40 mole %.

5. A method of forming a cured product, the method comprising injection molding the curable silicone composition according to claim 1.

6. A cured product obtained by curing the curable silicone composition according to claim 1.

7. The cured product according to claim 6, wherein a durometer of the cured product is less than Shore A 15 and the tensile strength is greater than 150 psi.

8. The curable silicone composition according to claim 2, further comprising:
   (E) a reaction inhibitor in an amount sufficient to control curing the composition.

9. The curable silicone composition according to claim 8, further comprising:
   (F) an organosiloxane having two silicon atom-bonded hydrogen atoms per molecule, in an amount such that the silicon atom-bonded hydrogen atoms in the organosiloxane in the total silicon atom-bonded hydrogen atoms in components (C) and (F) is not more than 40 mole %.

10. The curable silicone composition according to claim 3, further comprising:
    (F) an organosiloxane having two silicon atom-bonded hydrogen atoms per molecule, in an amount such that the silicon atom-bonded hydrogen atoms in the organosiloxane in the total silicon atom-bonded hydrogen atoms in components (C) and (F) is not more than 40 mole %.

11. A curable silicone composition comprising:
    (A) from about 40 to about 60 parts by mass of a silicone resin consisting essentially of $R_3SiO_{1/2}$ siloxane units and $SiO_{4/2}$ siloxane units, wherein each R is the same or different, and independently selected from halogen-substituted or unsubstituted monovalent hydrocarbon groups free of aliphatic unsaturated bonds, and the mole ratio of $R_3SiO_{1/2}$ siloxane units to $SiO_{4/2}$ siloxane units in the silicone resin having a value of from about 0.6 to about 1.5;
    (B) from about 60 to about 40 parts by mass of an organopolysiloxane having at least two alkenyl groups per molecule and free of $SiO_{4/2}$ siloxane units in the organopolysiloxane, with the proviso that the total amount of components (A) and (B) is 100 parts by mass;
    (C) an organosiloxane having at least three silicon atom-bonded hydrogen atoms per molecule, in an amount of the organosiloxane being sufficient enough to provide a molar ratio of silicon atom-bonded hydrogen atoms of component (C) to the alkenyl groups in component (B) in the range of from about 1.0 to about 3.0;
    (D) a hydrosilylation catalyst in an amount sufficient to initiate curing of the composition; and
    (F) an organosiloxane having two silicon atom-bonded hydrogen atoms per molecule, in an amount such that the silicon atom-bonded hydrogen atoms in the organosiloxane in the total silicon atom-bonded hydrogen atoms in components (C) and (F) is not more than 40 mole %.

12. The curable silicone composition according to claim 11, further comprising:
    (E) a reaction inhibitor in an amount sufficient to control curing the composition.

13. A method of forming a cured product, the method comprising injection molding the curable silicone composition according to claim 11.

14. A cured product obtained by curing the curable silicone composition according to claim 11.

15. The cured product according to claim 14, wherein a durometer of the cured product is less than Shore A 15 and the tensile strength is greater than 150 psi.

* * * * *